G. D. POGUE.
CRANK PIN LUBRICATING DEVICE.
APPLICATION FILED FEB. 16, 1918.

1,288,983.

Patented Dec. 24, 1918.

Inventor
George D. Pogue.
By Bakewell & Churn Attys.

UNITED STATES PATENT OFFICE.

GEORGE D. POGUE, OF ST. LOUIS, MISSOURI.

CRANK-PIN-LUBRICATING DEVICE.

1,288,983. Specification of Letters Patent. Patented Dec. 24, 1918.

Application filed February 16, 1918. Serial No. 217,470.

*To all whom it may concern:*

Be it known that I, GEORGE D. POGUE, a citizen of the United States, residing at St. Louis, Missouri, have invented a certain new and useful Improvement in Crank-Pin-Lubricating Devices, of which the following is a full, clear, and exact description, such as will enable others skilled in the art to which it appertains to make and use the same.

This invention relates to devices that are used for lubricating the crank pins of piston machines, and particularly to lubricating devices of the character that comprise a centrifugal ring of substantially channel shape in cross section secured to the crank shaft in concentric relation with one of the main bearings, means for supplying lubricating oil to said ring and a distributing duct leading from the channel in said ring to the surface of the crank pin which requires lubrication.

One objectionable feature of a crank pin lubricating device of the character referred to is that the distributing duct through which the oil is conducted to the crank pin is liable to become clogged, thus stopping the flow of oil, with resulting damage to the crank pin bearing, when the engine is operated in an atmosphere filled with dust, insects and flying vegetable fiber, such, for example, as cotton or the fluffy fiber thrown off by some kinds of trees during certain seasons of the year.

The main object of my invention is to provide an efficient crank pin lubricating device of the general kind referred to which is so constructed that dust, lint, fiber, insects and the like cannot collect in and thus clog the distributing duct through which the oil is supplied to the crank pin bearing.

Another object is to provide a crank pin lubricating device of the kind just referred to in which the oil ring on the crank shaft is equipped with a strainer of novel construction that can be easily removed for cleaning and easily replaced in operative position.

Figure 1:
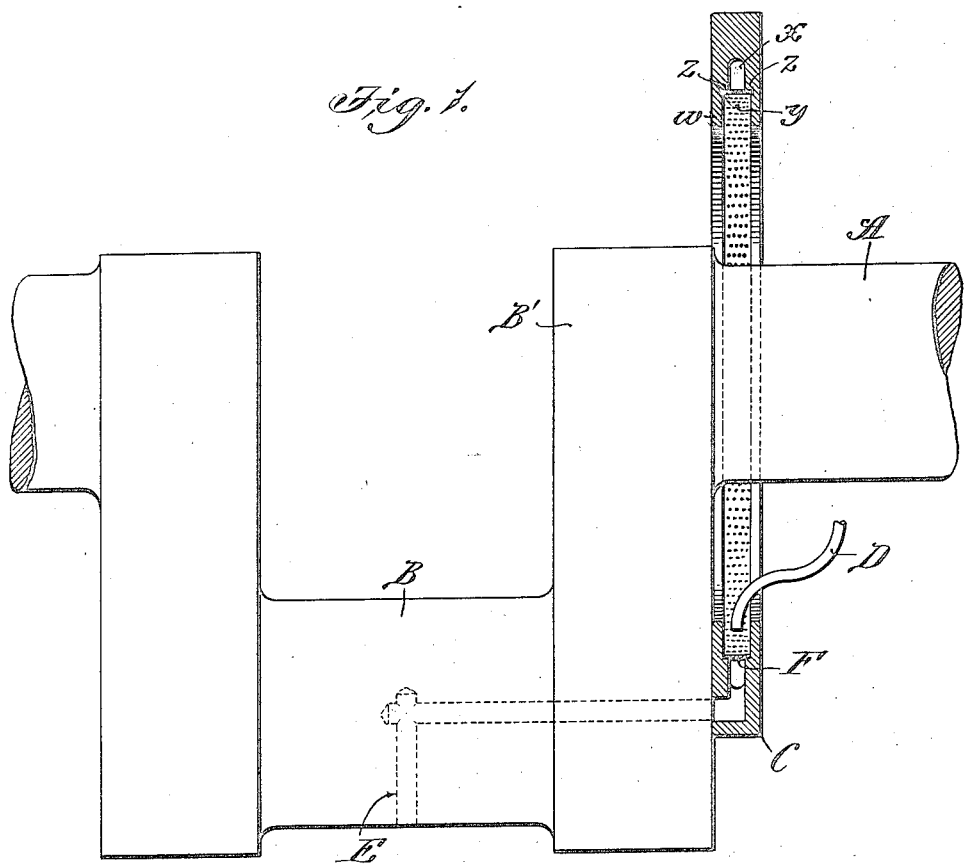

Figure 1 of the drawings is a side elevational view, partly in vertical section, of a crank pin lubricating device constructed in accordance with my invention.

Figure 2:
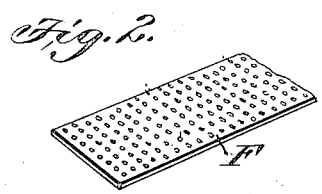
Figure 3:
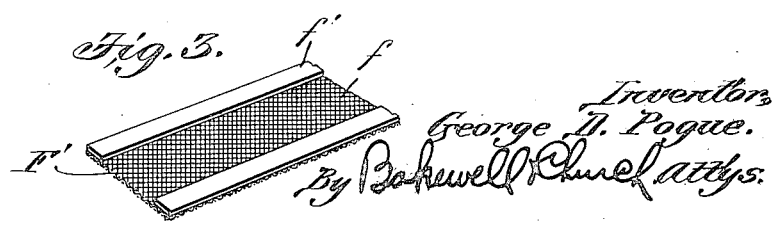

Fig. 2 is a perspective view of a portion of the strainer used in the lubricating device illustrated in Fig. 1; and Fig. 3 is a perspective view, illustrating a strainer of slightly different form.

Referring to the drawings which illustrate the preferred form of my invention, A designates a crank shaft provided with a crank pin B, C designates an oil ring that is arranged in concentric relation with one of the main bearings and secured in any suitable manner to the crank arm B', D designates an oil supply pipe that is mounted stationarily with respect to the oil ring C and so arranged that it will supply oil to said ring when the crank shaft is in operation, and E designates a distributing duct that leads from the oil ring C to the outer surface of the crank pin B, so as to supply oil to same and to the bearing (not shown) that surrounds the crank pin.

The oil ring C is provided with an annular groove $x$ that serves as a reservoir or collecting chamber for the oil which is supplied to the ring C by the oil supply pipe D, and the distributing duct E is so arranged that it always remains in direct communication with said reservoir $x$. In order that dust, lint, insects and the like will not enter the distributing duct E and clog same, I have provided the oil ring with a strainer F which is so disposed that all of the oil supplied by the pipe D to the ring C will have to pass through the strainer F before it reaches the distributing duct E or the groove $x$ in the ring C with which said distributing duct communicates. In the preferred form of my invention, as herein shown, the strainer F is of annular form and is arranged in an annular groove $y$ formed on the inner side of the ring C, said groove $y$ being a trifle wider than the groove $x$ previously referred to, so as to form shoulders $z$ at the side edges of the groove $x$ that serve as a bearing or supporting surface for the strainer F, the side walls $w$ of the groove $y$ being deep enough so as to prevent the escape of the oil which drips onto the strainer from the supply pipe D when the crank shaft is in operation.

It is immaterial, so far as my broad idea is concerned, how the strainer F is constructed and arranged, but I prefer to form said strainer from a thin strip of spring steel or other suitable material whose entire surface is perforated or provided with small, closely spaced holes, as shown in Fig. 2, said strip being arranged inside of the groove $y$ on the shoulders $z$ with its ends lapped or butted together.

As the tendency of the strainer strip is to lie flat, when it is placed in operative position in the groove $y$, the tension causes said strip to hug the shoulders $z$ closely, this spring tendency being augmented by the centrifugal action set up when the crank shaft is in operation.

A device of the character above described eliminates the possibility of dust, dirt, lint, fiber, insects and the like from becoming clogged in the distributing duct E through which the oil is supplied to the crank pin, owing to the fact that the oil supplied by the pipe D has to pass through the strainer F before it enters the oil collecting reservoir $x$ with which the distributing duct E communicates. After the engine has been in operation for a considerable period the strainer F can be removed from the oil ring C, cleaned in gasolene or in any other manner, and thereafter placed in operative position, it being possible to remove and replace the strainer easily, owing to the fact that it is retained in operative position by the inherent resiliency of the material from which the strainer is formed and by the centrifugal action set up when the crank shaft is in operation.

Instead of making the strainer F from a perforated strip of spring steel, the strainer could be made from a piece of woven wire cloth $f$ secured by rivets or in any other suitable manner to two resilient strips $f'$, as shown in Fig. 3.

Having thus described my invention, what I claim and desire to secure by Letters Patent, is:

1. A crank pin lubricating device, comprising a substantially ring-shaped member arranged so that it revolves with the crank shaft and provided with an annular oil groove or reservoir, means for supplying oil to said reservoir when the crank shaft is in operation, a strainer mounted on said member between said oil supplying means and said reservoir so as to prevent dust, lint, fiber and the like from entering said oil reservoir, and means for conducting the filtered oil from said reservoir to the crank pin of the crank shaft.

2. A crank pin lubricating device, comprising a substantially ring-shaped member arranged so that it revolves with the crank shaft and provided with an annular groove or reservoir to which oil is supplied, and a strainer arranged on said member between the source of oil supply and the oil reservoir in said member, said strainer being retained in operative position by the inherent resiliency of the material from which the strainer is formed and by the centrifugal force set up when the crank shaft is in operation.

3. A crank pin lubricating device, comprising a substantially ring-shaped member arranged so that it revolves with the crank shaft and provided with an annular oil reservoir, a distributing duct leading from said oil reservoir to the surface of the crank pin that requires lubrication, means for supplying oil to said reservoir when the crank shaft is in operation, and a removable strainer arranged on said ring-shaped member in such a manner that it will filter or strain the oil that is supplied to the reservoir in said member, said strainer being of substantially annular form and constructed in such a manner that it is under tension when arranged in operative position.

4. A crank pin lubricating device, comprising a substantially ring-shaped member arranged so that it revolves with the crank shaft and provided with an annular groove or chamber to which oil is supplied, shoulders or supporting surfaces on said member in proximity to said chamber, and a resilient strainer arranged on said member on said shoulders or supporting surfaces in such a manner that the inherent resiliency of same tends to hold it in operative position.

5. In a crank pin lubricating device, a crank shaft having a crank arm that is provided with a crank pin, a substantially ring-shaped member arranged in concentric relation with the crank shaft and mounted in such a manner that it revolves with the crank shaft, a groove or channel on the inner side of said ring, a stationarily mounted oil supply pipe that delivers oil to said channel, an annular strainer arranged in said channel, an oil reservoir in said member for receiving the oil that passes through said strainer, and a distributing duct leading from said oil reservoir to the surface of the crank pin that requires lubrication.

6. In a crank pin lubricating device, a crank shaft having a crank arm that is provided with a crank pin, a substantially ring-shaped member arranged in concentric relation with the crank shaft and mounted in such a manner that it revolves with the crank shaft, a groove or channel on the inner side of said ring, a stationarily mounted oil supply pipe that delivers oil to said channel, an annular strainer arranged in said channel, an oil reservoir in said member for receiving the oil that passes through said strainer, and a distributing duct leading from said oil reservoir to the surface of the crank pin that requires lubrication, said strainer being resilient so that the tension of same augmented by the centrifugal action set up when the crank shaft is in operation will hold said strainer in operative position.

GEORGE D. POGUE.